No. 885,248. PATENTED APR. 21, 1908.
H. D. HIBBARD.
PROCESS OF UTILIZING THE METALLOIDS IN CRUDE IRON FOR
REDUCING METALLIC IRON.
APPLICATION FILED MAR. 23, 1905.
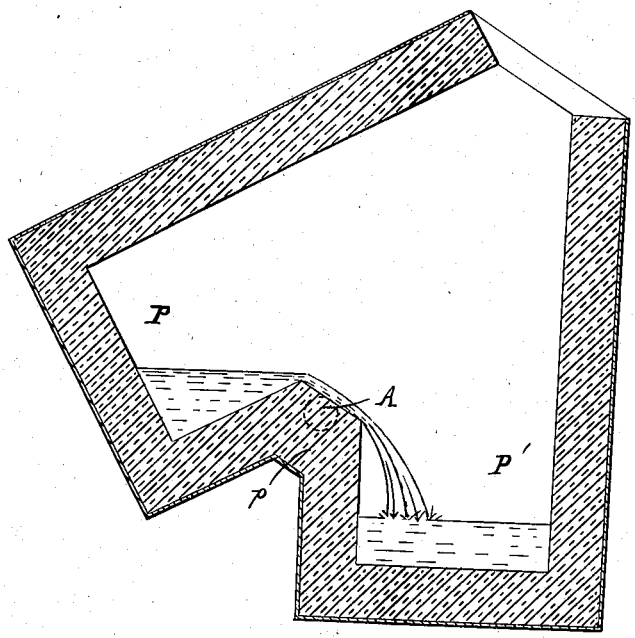
WITNESSES
INVENTOR
Henry D. Hibbard
BY
ATTORNEYS

UNITED STATES PATENT OFFICE.

HENRY D. HIBBARD, OF PLAINFIELD, NEW JERSEY.

PROCESS OF UTILIZING THE METALLOIDS IN CRUDE IRON FOR REDUCING METALLIC IRON.

No. 885,248.

Specification of Letters Patent.

Patented April 21, 1908.

Application filed March 23, 1905. Serial No. 251,677.

*To all whom it may concern:*

Be it known that I, HENRY D. HIBBARD, a citizen of the United States of America, residing in the city of Plainfield, Union county, and State of New Jersey, have invented a Process of Utilizing the Metalloids in Crude Iron for Reducing Metallic Iron, of which the following is a specification.

The main object of this invention is to utilize the potential energy represented by the calorific power of metalloids in crude iron, for the reduction of iron from its oxid to the metallic state, and this with a view of expediting the manufacture of steel by furnishing purified and refined iron to the melting furnace or converter.

This process may be carried out in such a way that its effect on the crude iron treated may result either (1) in refining only, that is, securing the elimination of silicon and manganese, or (2) in purifying, as well as refining the iron, that is, eliminating phosphorus and sulfur, as well as silicon and manganese, or (3) in partial decarbonization of the iron, as well as refining or purifying, or both.

The effect of carrying out my process is to secure a great saving in the time required for making a charge of steel, as well as securing a gain of iron as it gives increased yield from energy, which, in present practice, largely goes to waste. It will be understood that these results, viz., the saving of time and gain in yield, have an important effect in reducing the cost of steel manufacture.

The important feature of my invention consists in charging a vessel with a quantity of molten crude iron and oxid of iron, the crude iron containing sufficient of the metalloids to give by their oxidation heat enough to reduce a sufficient amount of oxid of iron to supply the necessary oxygen and maintain the charge in a molten condition during the treatment, and mechanically agitating this charge in the vessel without the introduction of fuel other than the metalloids in the iron. The reaction between the metalloids of the crude iron and the oxid of iron will burn the metalloids which will generate sufficient heat to keep the mixture molten, as well as to reduce the chemical equivalent of iron from its oxid and to form the slag, and this without the addition of fuel or heat to the vessel beyond that added in the two ingredients. With some varieties of iron sufficiently high in silicon, the oxid of iron may be added cold. If the silicon in the iron be low in amount, the oxid of iron is preferably put into the vessel in a molten condition, but with a greater percentage of silicon in the crude iron, the oxid added may be heated, or, as I have said, may in some cases even be cold, but it should be dry. To keep up the heat of the operation, I select iron containing sufficient amounts of silicon (and in the basic process, phosphorus) to give by their combustion the necessary temperature.

The quantity of ore or other oxid of iron added is proportioned to the amount of crude iron used and the amount of decarbonization desired in the product. I may add only enough oxid of iron to the charge to burn the silicon and manganese, and in some cases the phosphorus, or I may add more to burn a part of the carbon. Enough carbon is kept in to lower the fusion point of the iron to the proper degree in order to keep the refined metal liquid at the temperature of the process.

I may carry out my process by means of various constructions of apparatus, but for the more ready understanding of my invention I have illustrated in the sectional view, in the accompanying drawing, a vessel which may conveniently be employed for the purpose, and the use of which will be described by way of example only.

The vessel illustrated in the drawing is arranged so as to oscillate upon an axis at A, and it has two pockets P, P¹ on opposite sides of this axis, each pocket large enough to hold practically all the charge and having a dividing partition $p$ between them. The side walls may be extended upwardly and inwardly so as to provide a substantially closed vessel, leaving only an opening for charging and discharging. The vessel is preferably designed to conserve the heat of the interior as much as possible. The charge introduced into the vessel is mixed by oscillating the vessel back and forth upon its axis so that the molten charge is poured over the dividing partition wholly or in a large part at each oscillation, the lighter oxid on the top going first and the heavier metal then passing through it. This repeated pouring of the heavier metal through the lighter oxid is an important feature of the process. The vessel is oscillated back and forth so as to rapidly pass the metal through the oxid of iron. The rapidity and extent of mixing may be controlled by controlling the rate and extent of oscillation.

In carrying out the process by the use of the vessel referred to, I prefer to pre-heat the vessel by means of fire within it blown by a suitable blast; this simply to get the process started under suitable conditions of heat, but in the process itself I rely wholly on the heat of oxidation furnished by the metalloids. When the vessel has thus been suitably heated, I introduce the oxid either molten or heated or cold, as I have before explained, and I run in the molten crude iron of the charge. The order of introducing the crude iron and the oxid may be reversed, if desired, by adding the iron first. I may add some lime to the charge to form a part of the base needed for the slag to favor dephosphorization of the iron.

The vessel may have either an acid lining, or a basic lining, depending upon the composition of the crude iron and upon the subsequent treatment to be given the refined iron, that is, whether it is to be made into steel by an acid or basic process. If the purpose is to utilize the metalloids with the view of refining merely, that is elimination of silicon and manganese, the vessel should have an acid lining with the formation of a uni-silicate slag. If there is to be a purifying of the iron by the elimination of phosphorus and sulfur, as well as refining by the elimination of silicon and manganese, the vessel should have a basic lining and a tri-silicate slag will be formed, if the purification is to be complete. If there is to be a partial decarbonization as well, the vessel should be acid or neutral lined, if there is no intention to eliminate the phosphorus, but basic lined if phosphorus is to be eliminated.

In all other processes in which an elimination of the metalloids from crude iron occurs, the essential object has been the conversion of the iron into steel, and while in some cases there has been incidental and incomplete utilization of the potential energy of the metalloids, the gain of iron, when it has occurred, has been of secondary importance. In the present process, however, since the product is merely to serve as a raw material for steel making processes, exact composition is not a requisite in the product, and the process may be carried out on such lines and under such conditions as will give the largest percentage of gain and the greatest output due to the greatest economy of time and heat. The best practice requires that the loss of both heat and time must be kept at a minimum.

As will be understood from the foregoing explanations, the process is based on the utilization of the excess of heat of combustion of the metalloids, particularly silicon and phosphorus over that of iron. This excess is wholly relied on to furnish the necessary heat to carry out the process. In order that this may be more thoroughly understood, I will now give figures as to proportions and calorific powers in the case of a treatment in an acid or neutral lined vessel for a refining process resulting in the elimination of silicon and manganese, but it will be understood that these figures are given merely by way of example. The reaction is quite rapid, so that with the charge suggested in the example ten minutes will suffice for the treatment.

Taking the following grade of iron by way of example:

$3Si = 2.00\%$ : heat of combustion $= 7830°$ C.
$Mn = .50\%$ : heat of combustion to $Mn_2O_3 = 2410°$ C.
$P = .50\%$
$S = .04\%$
$C = 4.00\%$ {heat of combustion to $CO_2 = 8080°$ C.
{heat of combustion to $CO = 2473°$ C.
$Fe = 92.96\%$ {heat of combustion to $Fe_3O_4 = 1648°$ C.
{heat of combustion to $Fe_2O_3 = 1746°$ C.

Take weight of charge 10,000 kilos containing

Si 200 kilos requiring 228 kilos of O
Mn 50 kilos requiring 14.5 kilos of O 242.5

These two metalloids when oxidized will generate heat as follows:—

Si $200 \times 7830 = 1.566.000$ calories
Mn $50 \times 2410 = 120.500$ calories Total.....1,686.500 calories.

Assume in this case that no carbon is oxidized. The 242.5 kilos of oxygen required would be combined with about 636 kilos of iron in the form of magnetic oxid (878½ kilos) considering that the oxygen is 27.6% of the weight. The heat required to dissociate this amount of magnetic oxid ($Fe_3O_4$) would be $636 \times 1648 = 1048.128$ calories.

If $Fe_2O_3$ be the source of the oxygen, it will require 807 kilos, containing 565 kilos of iron. To dissociate this will require $565 \times 1746 = 986490$ calories.

The gain of iron in this case is 6.36 per cent.

For forming the slag 200 kilos Si forms 428 kilos $SiO_2$ and 943 kilos $SiO_2FeO$, 50 kilos Mn forms 72 kilos $M_2nO_3$. The $Mn_2O_3$ replaces FeO in the slag.

For complete refining (desiliconization) then there must be added 878½ kilos $Fe_3O_4$ (magnetic oxid) to supply oxygen and about 443 kilos to form slag. $878 + 443 = 1321$ kilos magnetic oxid of iron (perhaps partly replaced by lime) equal to 132 kilos per metric ton of iron treated, which must be heated to the melting point of the refined iron or say 1400° C. Assuming the specific heat of these oxids to average .20, the amount of heat required to raise their temperature to 1400° C., starting with them cold, would be $$1321 \times 1400 \times .20 = 369880 \text{ calories.}$$

The heat required then is

| | |
|---|---|
| For heating and fusing the oxids | 369880 calories |
| For dissociation of the oxid of iron | 1048128 calories |
| Total | 1418008 calories |
| The heat available is | 1686500 calories |
| Surplus | 268492 calories |

If the oxids be added hot, say at 800 °C., there would be a saving of heat of $$1321 \times 800 \times .20 = 211360 \text{ calories}$$

which would increase the surplus heat to $$268492 + 211360 = 479852 \text{ calories.}$$

This calculation takes no account of the latent heat of fusion of the oxid of iron which may amount to fifty (50) or sixty (60) degrees. On the other hand, it takes no account of the heat of formation of silicates from the oxids and silicic acid which would probably be a positive amount.

I claim as my invention

1. The mode herein described of utilizing the calorific power of the metalloids in crude iron in its reduction of iron from the oxid to the metallic state, said mode consisting in charging a vessel with a quantity of molten crude iron and adding thereto a quantity of oxid of iron, and mechanically agitating the mixture, the quantity of oxid of iron being so proportioned to the quantity of crude iron that the charge is maintained in molten condition by the oxidation of the metalloids in the crude iron without substantially affecting the carbon.

2. The mode herein described of utilizing the calorific power of the metalloids in crude iron in its reduction of iron from the oxid to the metallic state, said mode consisting in heating the interior of a vessel, then charging this preheated vessel with a quantity of molten crude iron and adding thereto a quantity of oxid of iron, and mechanically agitating the mixture, the quantity of oxid of iron being so proportioned to the quantity of crude iron that the charge is maintained in molten condition by the oxidation of the metalloids in the crude iron without substantially affecting the carbon.

3. The mode herein described of utilizing the calorific power of the metalloids in crude iron in its reduction of iron from the oxid to the metallic state, said mode consisting in charging a vessel with a quantity of molten crude iron and adding thereto, part at a time, a quantity of oxid of iron, and mechanically agitating the mixture, the quantity of oxid of iron being so proportioned to the quantity of crude iron that the charge is maintained in molten condition by the oxidation of the metalloids in the crude iron without substantially affecting the carbon.

4. The mode herein described of utilizing the calorific power of the metalloids in crude iron in its reduction of iron from the oxid to the metallic state, said mode consisting in charging a vessel with a quantity of molten crude iron and adding thereto a quantity of oxid of iron, and mechanically agitating the mixture in the vessel while it is substantially closed, the quantity of oxid of iron being so proportioned to the quantity of crude iron that the charge is maintained in molten condition by the oxidation of the metalloids in the crude iron without substantially affecting the carbon.

5. The mode herein described of utilizing the calorific power of the metalloids in crude iron in its reduction of iron from the oxid to the metallic state, said mode consisting in charging a vessel with a quantity of molten crude iron and adding thereto a quantity of oxid of iron, and mechanically agitating the mixture and repeatedly pouring the molten crude iron through the body of oxid of iron, the quantity of oxid of iron being so proportioned to the quantity of crude iron that the charge is maintained in molten condition by the oxidation of the metalloids in the crude iron without substantially affecting the carbon.

6. The mode herein described of utilizing the calorific power of the metalloids in crude iron in its reduction of iron to the metallic state, said mode consisting in heating the interior of a vessel, then charging this preheated vessel with a quantity of molten crude iron and adding thereto part at a time a quantity of oxid of iron and mechanically agitating the mixture in a closed vessel and repeatedly pouring the molten crude iron through the body of oxid of iron, the quantity of oxid of iron being so proportioned to the quantity of crude iron that the charge is maintained in molten condition by the oxidation of the metalloids in the crude iron without substantially affecting the carbon.

In testimony whereof I have signed my name to this specification, in the presence of two subscribing witnesses.

HENRY D. HIBBARD.

Witnesses:
C. SEDGWICK,
EDNA W. COLLINS.